DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 6

T887,009

FOG STABILIZERS FOR PHOTOGRAPHIC EMULSIONS

Dorothy Johnson Beavers and Norman Wayne Kalenda, both of Kodak Park Division, Rochester, N.Y. 14650

Filed June 22, 1970, Ser. No. 48,553

Int. Cl. G03c *1/34*

U.S. Cl. 96—109

No Drawing. 12 Pages Specification

There are disclosed photographic silver halide emulsions and photographic elements containing a fog stabilizing amount of a 1-thia-2,3,5,7-tetrazaindene derivative having the formula

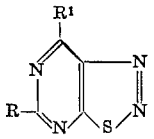

wherein R and $R^1$ are each hydrogen, a hydroxyl group, a mercapto group, an alkoxy group, a thioalkoxy group, an amino group, a carboxyl group, a carboalkoxy group, or a halide. Specific 1-thia-2,3,5,7-tetrazaindene derivatives which are disclosed are 4-benzylamino-1-thia-2,3,5,7-tetrazaindene, 4-amino-1-thia-2,3,5,7-tetrazaindene and 4-chloro-1-thia-2,3,5,7-tetrazaindene. These compounds, incorporated in a fog stabilizing concentration into photographic layers such as an emulsion coated onto a support, provide significant decreases in incubation fog.

Silver halide emulsions and elements stabilized as described can be chemically sensitized, e.g. with noble metal sensitizers alone or in combination with sulfur or selenium sensitizers. They can contain spectral sensitizers, incorporated color forming couplers, incorporated developing agents, other antifoggants, hardeners, plasticizers, coating aids, and other suitable photographic addenda such as described in U.S. Pat. 3,297,446 issued to Dunn on Jan. 10, 1967.